United States Patent [19]

Halpern

[11] Patent Number: 4,877,950
[45] Date of Patent: * Oct. 31, 1989

[54] ELECTRONIC PURSE-DEVICE

[75] Inventor: John W. Halpern, Potomac, Md.

[73] Assignee: Paperless Accounting, Inc., Washington, D.C.

[*] Notice: The portion of the term of this patent subsequent to Oct. 31, 2003 has been disclaimed.

[21] Appl. No.: 410,246

[22] Filed: Aug. 23, 1982

[51] Int. Cl.$^4$ .................................... G06K 19/00
[52] U.S. Cl. ........................................... 235/487
[58] Field of Search ............... 235/380, 487, 488, 492, 235/493

[56] References Cited

U.S. PATENT DOCUMENTS

| | | | |
|---|---|---|---|
| 3,859,508 | 1/1975 | Brosow | 235/380 |
| 4,224,666 | 9/1980 | Giraud | 235/380 |
| 4,277,837 | 7/1981 | Stuckert | 235/380 |
| 4,298,793 | 11/1981 | Melis | 235/488 |

OTHER PUBLICATIONS

IBM T.D.B., Vol. 10, No. 3, Aug., 1967, "Wallet Terminal", Davis, pp. 188-189.

Primary Examiner—Harold I. Pitts

[57] ABSTRACT

A self-contained purse-like electronic fund transfer device mainly for use in personal payment transactions, designed to be in the permanent possession of the user and featuring electromagnetic power injection from, and data transfer coupling with, a data terminal. A reader unit has a displaceable concave portion and the handheld personal payment device a convex portion in which the active flux carrying conductors are embedded in such a manner that relatively large angular shifts between the two parts do not interfere with the efficiency of the coupling or the speed of the transaction.

10 Claims, 2 Drawing Sheets

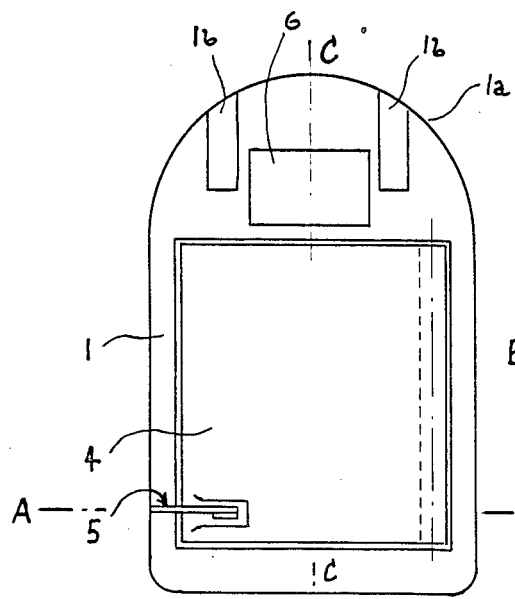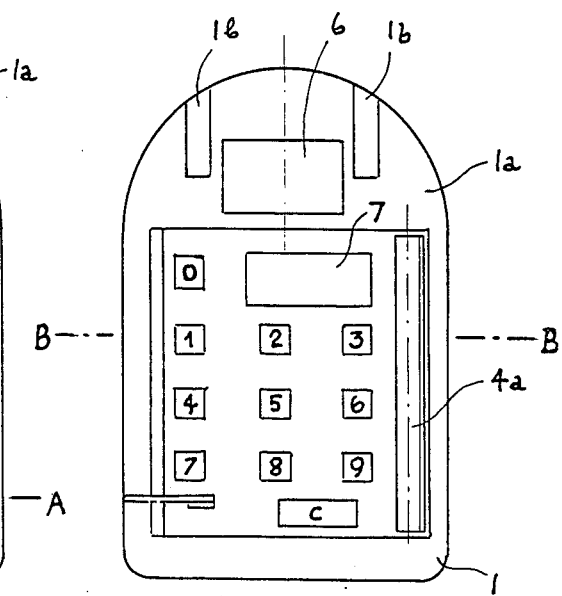
Fig.1  Fig.2
Fig.3  Fig.4
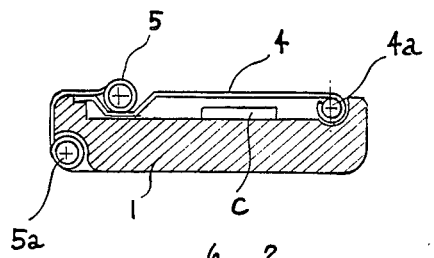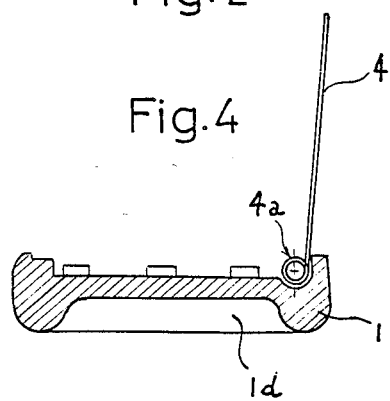
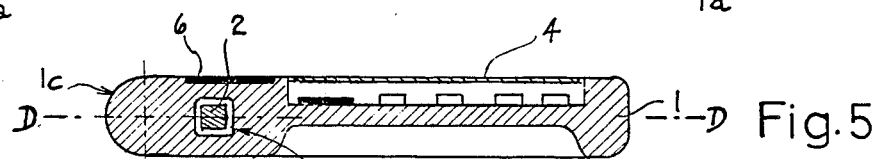
Fig.5
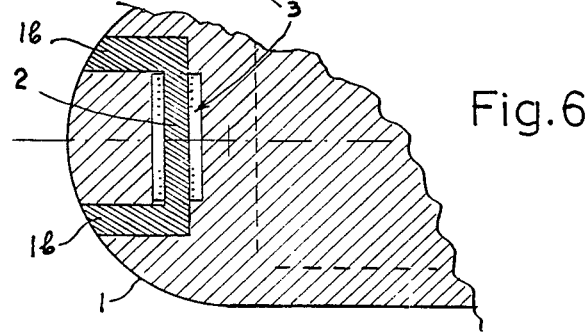
Fig.6

ELECTRONIC PURSE-DEVICE

BACKGROUND OF THE INVENTION

This invention relates to the general field of value-, credit- and access control cards which incorporate one or more large scale integrated circuits for receiving processing and memorizing information from a terminal, as well as imparting similar information to such a terminal and to display data in humanly readable form either on the terminal or on the card or on both.

Cards containing memory chips can hold not merely data about credit accounts, but also the equivalent of money, that is spendable small cash amounts for instant use. The user of the "card" mauy decide from which account or money compartment respectively any particular payment is to be made. The personal identification number, according to one of my inventions, can be keyed into the "card" directly. For all practical purposes, the "card" becomes a purse, with the added advantage that in an event of accidental loss or theft, no other person can spend anything from the stored credit accounts, or the stored money register of the card.

Present trends aim at making the card of dimensions identical to a traditional credit card. Terminals being designed to read and write such cards reliably by first drawing the card mechanically into a protected read-/write area and subsequently conveying the card back to the point where it was offered to the machine. This system is satisfactory where but a few high-value transactions are required to be carried out where the time factor is unimportant. However, one could enumerate a large number of medium-to-small cash vending transactions which are required to take not much time, perhaps one second at the very most. Cards are usually carried inside a wallet or plastic purse from which a given card has first to be extracted before it can altogether be offered to the vending mechanism. If the latter is fairly slow in operation, it is clear that the total time for a transaction may be between 10 to 20 seconds, by the time the card has been safely replaced into the wallet or purse. It is somewhat incongruous that a card combining electronically addressable value sections and having the same, if not greater, versatility and security than a conventional wallet, is at present still designed to be put into a wallet. One is reminded of the early combustion vehicles which makes everywhere built in close imitation of a horse-drawn carriage. One reason why most people still prefer the often very cumbersome method of paying in coins and bills is that it is still faster than the present day method of paying by credit or money card. A need thus exists for making the electronic purse ergonomically self-contained, that is to say to design its form and the manner of interfacing it with a reader device as to render the "card" conducive to everyday usage within the limits dictated by reliability and desirability.

SUMMARY OF THE INVENTION

It is an object of the invention to provide a self-contained instrument of payment such as can be conveniently carried without added protection in a jacket, or in a trouser's pocket, inside pocket, or in a handbag.

Further objects of the invention are:

(a) to make the device carryable in jacket or trousers pockets without a protective cover.

(b) to provide for an easily removed cover plate preventing data entry keys on the device from being accidentally activated.

(c) to permit the device to be interfaced with a data transfer terminal without requiring an accurate placing relative to the terminal thereby making device usage independent from the user's manual skill or sense of direction in space.

The means by which these objectives are achieved will become evident from the description aided by the illustrations.

BRIEF DESCRIPTION OF THE DRAWINGS

FIG. 1 is a top elevation of an electronic purse with the keyboard lid closed;

FIG. 2 is a top elevation as in FIG. 1 with the keyboard lid opened;

FIG. 3 is a sectional view taken along lines A—A of FIG. 1;

FIG. 4 is a sectional view taken along lines B—B of FIG. 2;

FIG. 5 is a longitudinal sectional view taken along lines C—C of FIG. 1;

FIG. 6 is a sectional view taken along lines D—D of FIG. 5;

DESCRIPTION OF THE PREFERRED EMBODIMENTS

Figure 7:
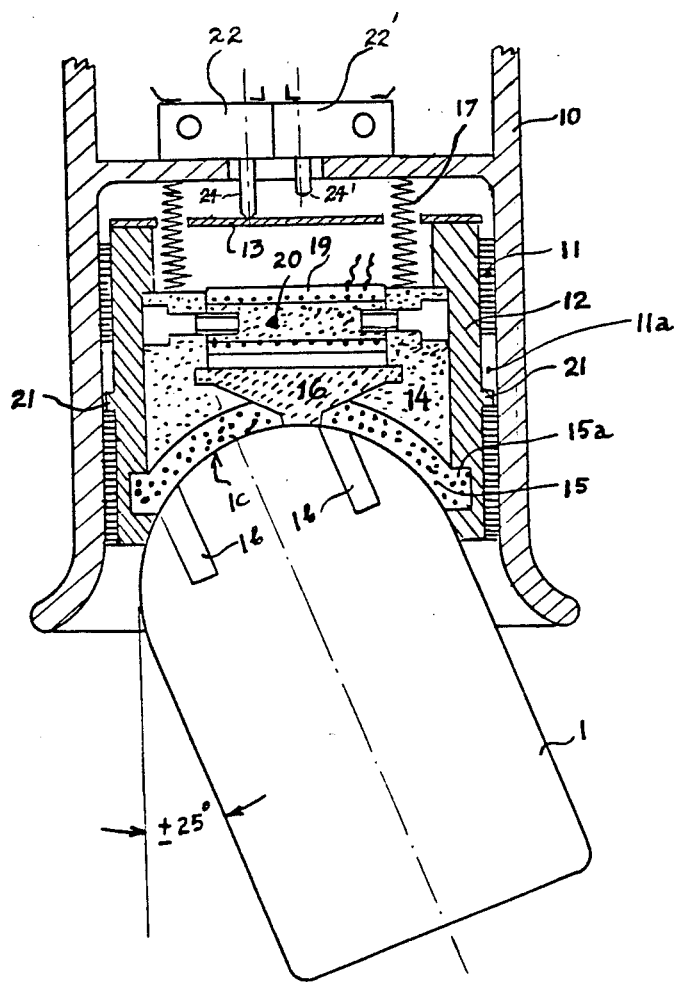
FIG. 7 is a data transfer terminal for interfacing data stored in the "electronic purse of FIGS. 1-6 with external data processing means.

FIGS. 1 and 2 show a "purse" device incorporating the invention. FIG. 1 shows the device 1 with the lid 4 in the closed position, while FIG. 2 shows the device with the lid 4 in the open position. The device is shown as having a liquid crystal display window 7, a photovoltaic cell 6 to recharge a battery (not shown) pushbuttons maked, for example 0-9, and a few special keys including a general "reset" key "C". The frontal upper portion 1c of the purse device 1 is perfectly circular; it has two inserts 1b which match with the circular semicircular boundary without any noticeable steps in the smooth surface.

A longitudinal cross section through the device at C—C in FIG. 1 is shown in FIG. 5. The role of the molded-in inserts 1b can best be recognized from FIG. 6; they form a part of an open transformer system having a cylindrical bridge portion 2 with bobbin and inductor coil 3. The elements 1b are the pole shoes extending right to the surface 1c which during a data transfer cycle make good contact with a specially designed read/write device (FIG. 7).

FIG. 4 shows a section through the opened "purse" device of FIG. 2 taken along lines B—B. The thickness of the device is carefully selected with a view to permitting a good grip without feeling bulky. To save weight, the device has one or more recessed portions 1d. FIG. 3 shows how the closed condition is secured by a spring-loaded clip 5 hinged around an axle 5a. To open the lid, the looped end portion is turned backwards to the left, and the lid 4 will spring open into its FIG. 4 position. The reverse sequence is observed when the lid is closed and the retaining clip 5 momentarily drawn aside and, when the lid is fully closed, released to exert its retaining action.

The read/write terminal or transducer of FIG. 7 consists of a main frame 10 which is fitted with low friction guide rails 11 on each side. These rails each have a slot 11a into which a pivot pin 21 protrudes which is integral with a bracket 12 made of nonmagnetic material. These systematically arranged left and right brackets 12 carry ferrite components 14 with an inductor core 20 and coil 19. The front portions 15 of these ferrite elements are shaped like the negative of the front portion 1c of the electronic purse component 1 and consist of a molded, slightly resilient ferrite compound. The remaining nonferrite portion is filled with a material 16 of similar resilience but having low magnetic permeability. The brackets 12 are bridged by a curved metal plate 13 for stiffening purposes and to actuate a pin 24 for operating a microswitch 22, when the assembly is pushed against the presence of springs 17 in a rearward direction.

The device is operated as follows: the customer wishing to make a payment or to update his/her "electronic purse device" first keys in the personal ID number via the device keyboard. Thereafter, the device with the rounded portion in the forward direction is placed into the concave portion of the recess mainly formed by parts 15 and 16 (FIG. 7) of the terminal, and presses against them so that the entire assembly slides backwards along guide rails 11 until pin 24 bears against the cross bar 13 and the microswitch 22 is closed. From that moment, the data transfer cycle commences, and in most cases is likely to be completed after about 200 milliseconds or less. Completion of the transaction is indicated by the sounding of a gong, or the lighting of a display, such as "transaction completed." The user will thereafter withdraw the device 1. The total data exchange should preferably take less time than the inertial delay due to the human reaction factor for withdrawing the purse device. This would ensure that a willful attempt at interrupting a transaction prematurely cannot take place. In other words, even if the purse device were withdrawn manually as soon as the bottom of the displacement stroke is reached and the microswitch is engaged, there would remain a certain time lapse during which the pressure of the springs 17 would cause the displaceable part of the interface device to follow the retracting movement of the hand and keep the magnetic coupling loop intact, long enough to complete the data transfer cycle. The combination of the human and mechanical delays can be arranged to be longer than the total transaction time, and therefore no further safeguards are needed. This aspect provides an important design parameter for a read/write terminal for a large number of practical applications where simplicity of the terminal is very important and the execution of rapid cash transaction is vital.

Figure 8:
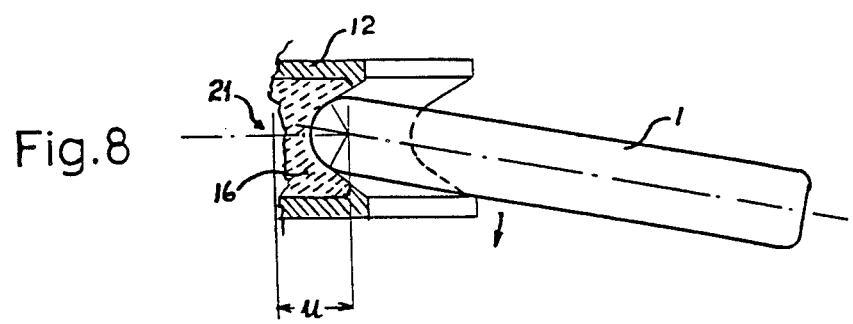
FIG. 8 is a schematic side view of the purse and terminal illustrating automatic adaption to "electronic purse" insertion angle deviations.

Another vital demand to be made on the system is that the user is not expected to perform any careful alignment of the electronic purse device relative to the shape or position of the terminal device. As can be seen from FIG. 7 of the axis of a purse device may have the extreme misalignment of 25° with the displacement axis of the terminal, yet the magnetic circuit is still adequately closed, giving the same flux linkage as if the purse device were prefectly aligned. FIG. 8 shows that the purse device may be inserted also at an inclined angle because the pivot 21 (FIG. 7 and 8) permits the movable inductor portion to swing into alignment with the inclined purse device 1. The distance between the center of the curved portion and the pivot center (=u) should thereby be as small as possible, preferably with the two centers coinciding.

In a modified sequence of the data transfer process there would be two switches consequently operated by the receptable portion of the read/write device as it is being pushed manually by means of the checked-in purse-like fund transfer device 1 to make two operation phase. The first one 22 starts the data transfer cycle. The second one 22' signals the completion of the data transfer cycle. (Striking a gong, lighting an inscription, for example "transaction completed," or, "Device invalid" or, "Add cash in updating device.")

Still a further alternative replaces the action of the first switch by a trigger circuit which senses the degree of coupling established between the fund transfer device 1 and the read/write unit electronically, and once a safe degree of coupling is sensed indicating that the user has acceptably postured his device 1 relative to the read/write unit, the electronic circuit will generate the initiating signal for commencing the data transfer cycle. If, however, the necessary minimum coupling does not exist by the time the second switch is operated (usually coinciding with the limit of the displacement stroke), the action is aborted and is prevented from starting even if subsequently proper placing of the device is carried out by the user. This ensures that no one can be tempted to play games with the system, trying to produce incomplete transactions giving wrong results. However, the design of the fund transfer device 1 and associable read/write device according to the invention specifically aims at making it easy for the average member of the general public to obtain near perfect coupling conditions even when lack of spatial orientation may lead to very substantial angular shifts from the "correct" insertion posture.

What is claimed is:

1. For use with an electronic fund transfer device having an outer wall portion with a reactive transfer element for enabling transfer of data between said transfer device and an associated device; a terminal having a frame, receptable means coupled to said frame for reciprocable motion between a ready position and an operate position, said receptacle having a forward wall portion accessible by the outer wall portion of the transfer device, said forward wall portion including a reactive transfer element reactively engageable with the transfer device reactive transfer element when the outer wall portion and said forward wall portion are arranged in mutual contact, means for biasing said receptacle means to said ready position, and means for enabling data transfer via said reactive elements when said receptacle means is moved towards said operate position.

2. The invention of claim 1 wherein said bias means comprises at least one spring coupled between said frame and said receptacle means.

3. The invention of claim 1 wherein said data transfer enabling means comprises switch means engageable with said receptacle means when said receptacle means has reached the operate position.

4. The invention of claim 1 further including means for sensing the arrival of said receptacle means at the operate position.

5. The invention of claim 1 wherein said receptacle means is pivotably mounted in said frame for limited pivotal motion about an axis substantially normal to a line between said ready position and said operate position.

6. For use with a receptacle having a curved forward wall portion with a first spaced pair of reactive transfer elements; an electronic fund transfer device comprising a housing with a curved forward wall portion, a second spaced pair of reactive transfer elements in said forward wall portion of said transfer device, said forward wall portion of said transfer device having a curvature complementary to the curvature of the forward wall portion of the receptacle, the spacing between said second pair of reactive transfer elements being greater than the spacing between the first pair of reactive transfer elements and the width of said second pair of reactive transfer elements being less than the width of the first pair of reactive transfer elements so that said second pair of reactive transfer elements is reactively engageable with the first pair of reactive transfer elements over a range of angles measured in the plane of curvature of the receptacle forward wall portion.

7. The invention of claim 6 wherein the first and second pair of reactive transfer elements comprise pole shoes of an inductance element in the receptacle and said transfer device, respectively.

8. The invention of claim 6 wherein the receptacle forward wall portion has a first curvature in a first plane and a second curvature in a second plane substantially normal to the first plane; and wherein said forward wall portion of said transfer device has a first curvature complementary with the first curvature of the receptacle forward wall portion and a second curvature complementary with the second curvature of the receptacle forward wall portion so that said second pair of reactive transfer elements is reactively engageable with the first pair of reactive transfer elements over a range of solid angles measured with respect to the first and second planes.

9. The invention of claim 6 wherein the curvature of said transfer device forward wall portion is convex.

10. The invention of claim 1 wherein said bias means comprises an elastically displaceable element coupled between said frame and said forward wall portion of said receptacle means.

* * * * *